United States Patent [19]

Takasago

[11] Patent Number: 5,285,435
[45] Date of Patent: Feb. 8, 1994

[54] CONTROLLING POSITIONING OF RECORDING/REPRODUCING HEAD BY COMBINING A POSITION DIFFERENTIATION AND A DRIVE CURRENT INTEGRATION

[75] Inventor: Masahiro Takasago, Odawara, Japan

[73] Assignee: Hitachi, Ltd., Tokyo, Japan

[21] Appl. No.: 915,507

[22] Filed: Jul. 20, 1992

[30] Foreign Application Priority Data

Aug. 1, 1991 [JP] Japan .................. 03-214110

[51] Int. Cl.⁵ .............................. G11B 7/085
[52] U.S. Cl. ...................... 369/44.280; 369/44.340; 369/54
[58] Field of Search ............... 369/32, 44.28, 44.34, 369/54, 53; 360/78.04–78.07, 78.09, 78.12

[56] References Cited

U.S. PATENT DOCUMENTS

| | | | |
|---|---|---|---|
| 4,839,876 | 6/1989 | Fennema | 369/44.28 X |
| 5,090,001 | 2/1992 | Ito et al. | 369/44.28 |
| 5,117,410 | 5/1992 | Akiyama | 369/44.28 X |
| 5,161,140 | 11/1992 | Terada | 360/78.07 X |
| 5,197,058 | 3/1993 | Bell, Jr. et al. | 369/44.28 |

FOREIGN PATENT DOCUMENTS 58-77037 5/1983 Japan .

*Primary Examiner*—W. R. Young
*Attorney, Agent, or Firm*—Fay, Sharpe, Beall, Fagan, Minnich & McKee

[57] ABSTRACT

It is intended that the relative head speed for a track in seeking is detected precisely without being influenced by track swing due to eccentricity of a disk. To this end, the current (proportional to the acceleration of an optical head) for a voice coil motor for driving an optical head is previously detected while track following control is executed and the detected data are stored in memory. In seeking, the sum of a detected current (representative of the acceleration of the head for a fixed component) and the data supplied from the memory is integrated to provide the relative speed of the head for a track. The relative speed signal is added to the differential signal of a pulsated signal of the track traversing signal of the head. The addition output represents the precise relative speed signal in consideration of track swing. If the voice coil motor is controlled so that this relative speed coincides with a target speed signal, the head speed can be controlled without being influenced by the track swing.

10 Claims, 3 Drawing Sheets

CONTROLLING POSITIONING OF RECORDING/REPRODUCING HEAD BY COMBINING A POSITION DIFFERENTIATION AND A DRIVE CURRENT INTEGRATION

BACKGROUND OF THE INVENTION

The present invention relates to an information recording/reproducing device such as an optical disk device and a magnetic disk device. Specifically, the present invention relates to a method of controlling positioning of a recording/reproducing head which intends to position the recording/reproducing head on a desired track of a rotary disk-shape recording medium with concentric or spiral tracks, and more particularly to a method of controlling positioning of a recording/reproducing head and an information recording/reproducing device which use a speed detecting method which can precisely detect the relative speed of the recording/reproducing head for a track.

In a magnetic disk device, a previously known seeking system positions a recording/reproducing head on a target track of a disk-shape recording medium by detecting the relative speed of the recording/reproducing head for a track using a sum of a differentiated value of the position information obtained when the head traverses each track and an integrated value of the driving current for shifting the head.

Such a system controls the moving speed of the recording/reproducing head on the basis of a speed signal which is a sum of the differential signal of position information obtained from a track in seeking and the integral signal of an actuator driving current for the head. In this case, the differential signal, although it is the relative speed signal of the head for a track, is an intermittent and relatively high frequency component signal so that it cannot detect a change in the relative speed having a continuous and relatively low frequency component due to eccentricity and cannot transmit the detected change. On the other hand, the integral signal, although it is a continuous and relatively low frequency component signal, is the absolute speed signal of the head but not the relative speed so that it cannot also detect a change in the relative speed due to eccentricity and transmit the detected change. As a result, the known system cannot precisely detect a change in the relative speed which results from track swing due to eccentricity and cannot control the head so that it is swiftly positioned on a target track.

SUMMARY OF THE INVENTION

An object of the present invention is to provide a method of controlling positioning of a recording/reproducing head which can detect the relative speed of the recording/reproducing head for a track without being influenced by track swing due to eccentricity of a recording medium thereby to position the head with great accuracy and at high speed.

Another object of the present invention is to provide an information recording/reproducing device which can position the head with great accuracy and at high speed without being influenced by track swing due to eccentricity of a recording medium.

Still further advantages of the present invention will become apparent to those of ordinary skill in the art upon reading and understanding the following detailed description of the preferred and alternate embodiments.

BRIEF DESCRIPTION OF THE DRAWINGS

The invention will be described in conjunction with certain drawings which are for the purpose of illustrating the preferred and alternate embodiments of the invention only, and for the purpose of limiting the same, and wherein.

DESCRIPTION OF THE PREFERRED EMBODIMENTS

First, an explanation will be given of the problem to be solved by the present invention.

Figure 1:
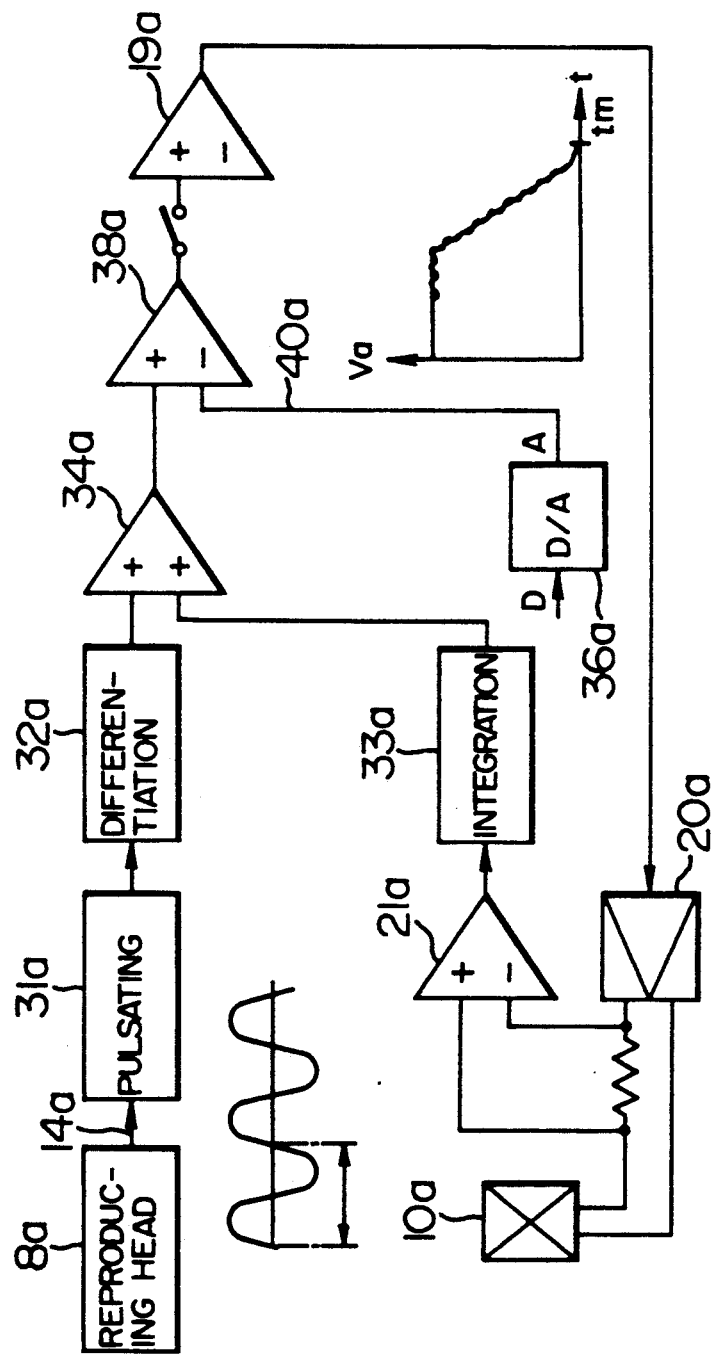
FIG. 1 is a schematic block diagram showing a seeking system in a magnetic disk device.

FIG. 1 shows the schematic arrangement of a seeking system in a magnetic disk device. In seeking, an actuator mechanism including a driving coil 10a causes a recording/reproducing head 8a to traverse a track(s) on a recording medium to shift to a target track. When the head traverses the track, it detects a track traversing signal, i.e., head position information 14a. The head position information 14a is pulsated by a pulsating circuit 31a. The pulsated information is differentiated by a differentiation circuit 32a to provide a signal representative of the relative speed of the recording/reproducing head 8a for a track. The signal is added to an adder circuit 34a. This differential signal is a signal which is intermittent for each track and has a relatively high frequency component; this signal can be detected mainly at a high head speed. On the other hand, the driving current for the recording/reproducing head actuator (driving coil) 10a is detected by a current detection circuit 21a. The detected signal is integrated by an integration circuit 33a. The integral signal is added to the adder circuit 34a. Since the detected current substantially corresponds to the acceleration of the recording/reproducing head, its integral substantially corresponds to the absolute speed (speed for a fixed component such as a base and spindle motor) of the head 8a. This integral signal is a continuous signal having a relatively low frequency component; it can be detected at a relatively low head speed. The output vd from the adder circuit 34a is a continuous signal belonging to a wide band and represents the detected speed signal of the head 8a. The detected speed signal vd is applied to one input terminal of a subtraction circuit 38a. On the other hand, in order to move the head 8a to a target track, the target speed data previously prepared (registered) is D/A-converted by a D/A converter 36a, and the converted target speed signal (target speed curve) 40a is applied to the other input terminal of the subtraction circuit 38a. The target speed signal 40a represents a corresponding target speed Va at a time tm as shown in a chart. The difference between the detected speed signal vd and the target speed signal 40a is applied to a power amplifier 20a through a amplifier 19a. The power amplifier 20a drives the actuator 10a so that the recording/reproducing head 8a approaches the target track.

An optical disk device, in which the distance between adjacent tracks is very short, does not directly use the information from a track, but in place of this, has an external scale attached to an optical head to move the optical head using a position signal obtained from the external scale. In this case, the head position information 14a is not extracted from the recording/reproducing head in FIG. 1, but from the external scale. The remaining construction and operation are entirely the same as those in FIG. 1. Specifically, the moving speed of the optical head is detected on the basis of the sum of a differential value of the position signal obtained from the external scale and the integral value of the current for driving the optical head. However, this method, in which the accuracy of positioning using the external scale is poor, eventually requires the optical head to be controlled by the signal from a track instead of that from the external scale. This lengthens the seek time.

In order to overcome such an inconvenience, in the optical disk device also, as in the magnetic disk as shown in FIG. 1, a method has been proposed which directly uses the positioning information obtained from a track to position the optical head. In this method, the detected speed signal for the optical head is obtained from the sum of the differential signal of the position information from a track in seeking and the integral signal of the driving current for the actuator for the optical head. The seeking speed of the optical head is controlled using this detected speed signal.

The seeking operation must move and position the head onto the target information track of a disk recording medium swiftly and precisely. In consideration of this, the moving speed of the head represented as the relative speed for a track which the head traverses, but not as the absolute track (i.e., speed for a fixed component), must be controlled so as to meet a target speed curve. In the method which controls the moving speed of the head on the basis of the sum of the differential signal of position information from a track in seeking and the integral signal of the driving current for the head actuator, the former signal corresponds to the relative speed for a track whereas the latter signal does not correspond to the relative speed but the absolute speed for the base to which mechanism components such as a spindle motor is attached. In the state where the integral signal in the sum signal greatly influences the moving speed of the head, the accuracy of detecting the relative speed for a track will be lowered. This makes it difficult to position the head swiftly onto a target track.

Meanwhile, where tracks on a disk recording medium swings in the radial direction owing to eccentricity of the medium as the medium rotates, the above head absolute speed remains fixed but the relative speed changes greatly. The position of each track in the radial direction is not fixed and swings as the disk medium rotates. The, influence of the track swing due to the eccentricity on the relative speed increases as the track density is large (track pitch is narrow) as in an optical disk recording medium, and the moving speed is low.

Figure 2:
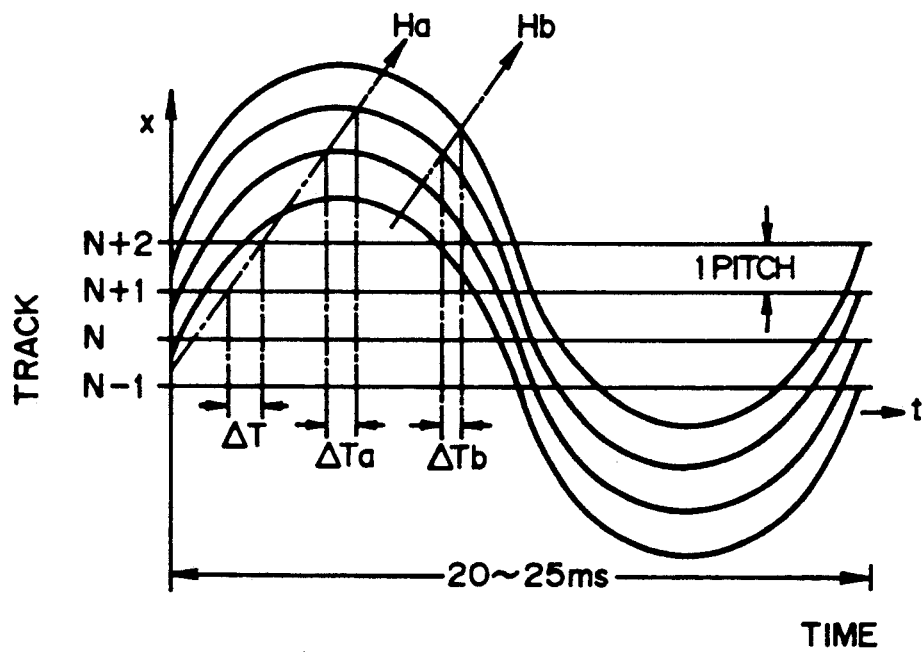
FIG. 2 is a graph for explaining influence of track swing due to eccentricity.

Referring to FIG. 2, the above problem will be explained. In FIG. 2, the abscissa represents the time taken t when the optical disk recording medium rotates substantially once, and the ordinate represents the positions x of tracks (which are assumed to be concentric) on the medium in its radial direction. Numerals N-1, N, N+1, N+2 , . . . denotes tracks. As seen from FIG. 2, these tracks change in a sinusoidal wave curve owing to the eccentricity during one rotation. The rotation speed of the recording medium is usually 2400 rpm-3000 rpm (the rotation period is 20 msec-25 msec). The time required for head seek is about 1 msec for seek for the nearest track (or adjacent track ) and 100-200 msec for seek for the farthest track (or from the innermost track to outermost track). The track pitch is about 1.5 $\mu$m. The track swing width due to the eccentricity may be 100 $\mu$m corresponding to 60-70 tracks (exceeding one digit).

Now it is assumed that seeking is performed so that the optical head traverses tracks as illustrated in Ha in FIG. 2. The absolute speed of the optical head (i.e. speed for a fixed portion) can be determined as [track pitch/$\Delta$T] assuming a fixed track, but the relative speed for a track changes as [track pitch/$\Delta$Ta]. This relative speed changes in accordance with the rotation phase of the optical disk, and is [track pitch/$\Delta$Tb] at e.g., a phase of Hb. When the track swing increases towards the moving direction of the head, the relative speed becomes lower than the absolute speed, whereas the track swing increases toward the direction opposite to the moving direction of the head, the relative speed becomes higher than the absolute speed. As the rotation speed of the optical disk becomes low, the influence of the track swing due to the eccentricity on the relative speed becomes great. Further, a change in the relative speed due to the eccentricity is synchronous with the rotation of the disk so that it occurs sinusoidally at a period of one rotation in a continuous, regular and repeated manner; the value of the frequency component of the speed change is relatively small. The disk device with a relatively large track pitch such as a magnetic disk device has also more or less the same problem as described above.

The present invention intends to detect the relative speed of a recording/reproducing head for a track without being influenced by the track swing due to the eccentricity.

To this end, the information recording/reproducing device according to the present invention includes a head for recording/reproducing information on/from a disk recording medium; head driving circuit for positioning the head on a target track of the recording medium; and speed control circuit including circuit for storing data relative to track swing over at least one rotation section on the recording medium, circuit for differentiating, in seeking, position information obtained when the head traverses a track on the recording medium thereby to introduce first head speed information for the track, circuit for integrating, in seeking, the driving current for the head driving circuit thereby to introduce the head speed information for a fixed component and correcting the introduced head speed information using the data relative to the track swing to provide second head speed information for the track, and circuit for composing the first and second speed information into third head speed information for the track, thereby controlling the head driving circuit so that the third head speed information coincides with a target speed signal.

More specifically, the circuit for storing the data relative to the track swing is composed of circuit for previously detecting the driving current supplied to the head driving circuit over at least one rotation section of the recording medium while track-following control is performed, and circuit for storing the detected driving current. Otherwise, the circuit for storing the data relative to the track swing may be constituted by circuit for previously calculating the number of tracks which the head traverses at several rotating phases over at least one rotation section of the recording medium when the recording medium rotates in a state where the head remains stationary at a certain radial position of the recording medium, thereby acquiring the track swing from the calculated result, and storing it.

The data relative to the track swing may be acquired by measurement for any optional one track of the disk recording medium, but they may be measured for three tracks of an innermost, center and outermost tracks to use the nearest data of these measured data in accordance with the head position in seeking.

In seeking, the differential (first head speed information) of the position information (track traversing signal) obtained when the head traverses a track on the disk recording medium represents the moving speed of the head tentatively, but does not includes the component of a continuous and relatively slow speed change caused by the track swing due to the eccentricity of the recording medium. Further, in seeking, the integral (head speed information) of the driving current for the head driving circuit (voice coil motor of a head actuator), which includes the component of a continuous and relatively slow speed change, represents the head moving speed for a fixed component but does not represent the head moving speed for a track. In accordance with the present invention, the data (i.e., a speed change component due to the track swing) prepared before seeking as the data relative to the track swing are added to the head speed information resulting from integration of the above driving current This provides relative head moving speed information (second head speed information) for a track in consideration of the influence by the track swing. Adding the first and second head speed information provides precise head moving speed information (third head speed information) in a wide band including the speed change component due to the track swing as the relative speed for a track. Using this information, head positioning (seeking) control can be carried out precisely and swiftly.

In seeking, the integral of the driving current supplied to the head driving circuit represents the absolute speed for a fixed component so that it cannot be used to detect the track swing. The amount of track swing or the change in the head moving speed due to the track swing amount must be detected prior to executing the seeking operation.

The change in the head moving speed due to the track swing amount can be detected as follows. Prior to executing the seeking operation, e.g., in starting up a disk device or loading a disk recording medium, track-following control is done. Then, the integral (which corresponds to a speed change due to track swing) of the driving current of the head driving circuit is acquired for at least one rotation of the disk as a function of the rotation angle (phase) from a reference position and thereafter stored. Otherwise, the disk is rotated with the head remaining stationary at a certain position of the disk in the radial direction. Then, the number of tracks which the head traverses is measured as a function of the rotation angle from a reference position and thereafter stored. In both cases, storage may be made in either form of the track swing amount and the speed changing amount due to it.

Figure 3:
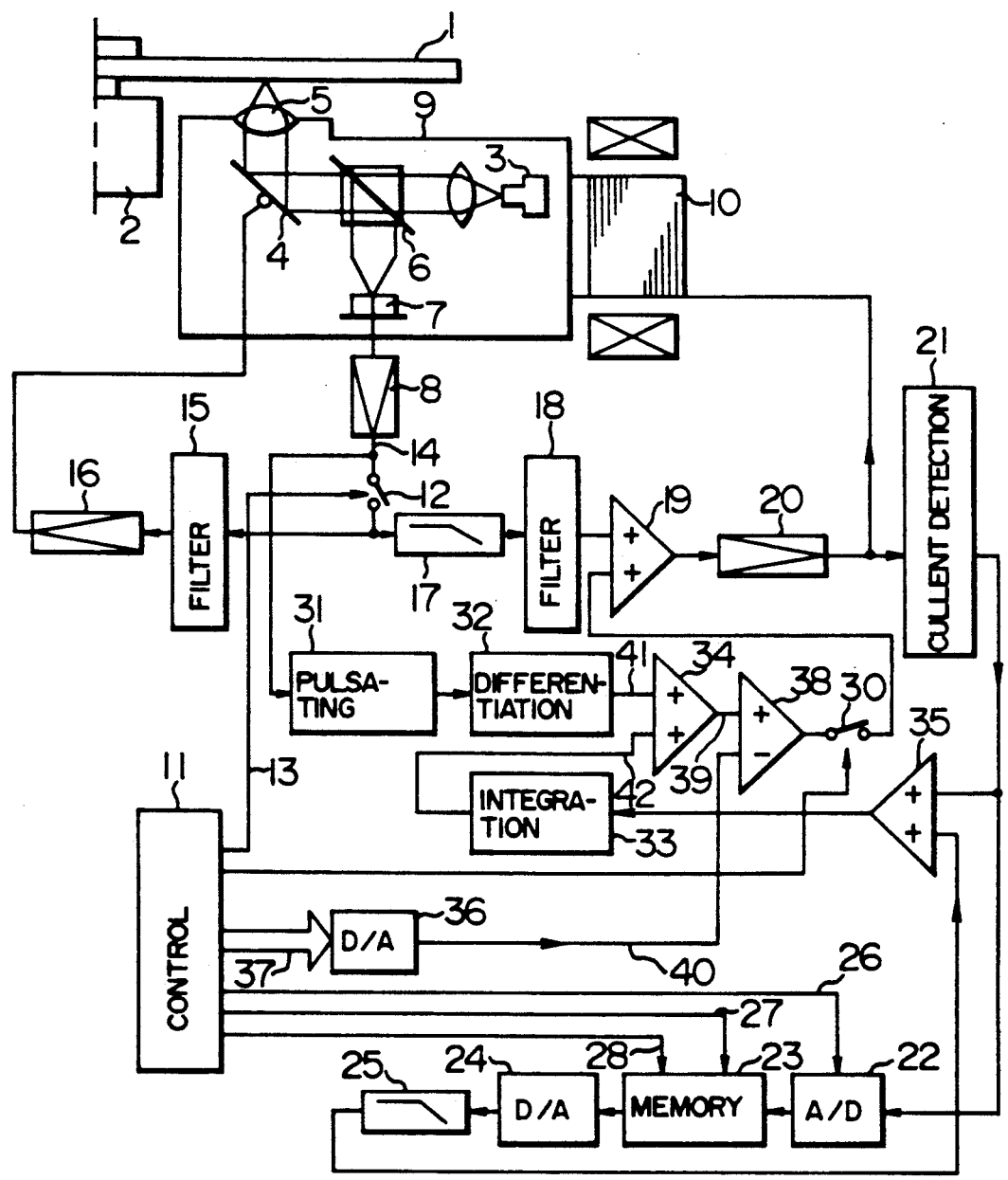
FIG. 3 is a schematic block diagram of an arrangement of an information recording/reproducing device according to one embodiment of the present invention.

FIG. 3 shows an arrangement of one embodiment of the present invention. Numeral 1 denotes an optical disk; 2 a spindle motor; 3 a semiconductor laser; 4 a galvanomirror; 5 an objective lens; 6 a beam splitter; 7 a photodetector; and 8 an amplifier. In operation, the disk 1 is rotated by the spindle motor 2. The light emitted from the semiconductor laser 3 passes through the galvanomirror 4 and converged by the objective lens 5. The converged light is projected onto the disk 1 as a light spot. Likewise, the light reflected by the disk 1 passes through the objective lens 5, the galvanomirror 4 and the beam splitter 6 and reaches the photodetector 7 which converts the light into an electric signal. This reflected light provides a signal representative of the relative position relationship between an information track and a light spot on the disk 1. The electric signal from the photodetector 7 is amplified by the amplifier 8. The amplified signal provides a position information signal 14 required to cause the light spot to follow the information track or shift from a track to another track. The optical system (3-7) including the semiconductor laser 3 constitutes an optical head 9 which can be moved in the radial direction by a voice coil motor 10.

A filter 15 and a power amplifier 16, together with the galvanomirror 4, constitute a track-following fine servo loop. A low-pass filter circuit 17, a filter 18, an adder circuit 19 and a power amplifier 20, together with the voice coil motor 10, constitute a track-following coarse servo loop. In order to cause the light spot to follow a track, a control signal 13 which serves to close a switch 12 is issued from a control unit 11 (then, a switch 30 described later is open). The signal representative of the relative positions of the track and light spot (hereinafter referred to as a track signal for short) 14 is, on one hand, passes through a filter 15 for stabilizing the servo loop and drives the galvanomirror with the aid of the power amplifier 16. The galvanomirror 4 serves to cause the light spot to follow minute swing of the track. On the other hand, the track signal is extracted in its low frequency component by the low-pass filter 17. The low frequency component passes through the filter 18 for stabilizing the servo loop and drives the voice coil motor 10 via the adder circuit 19 and the power amplifier 20.

Numeral 21 denotes a current detector circuit, 22 denotes an A/D converter; 23 memory; 24 a D/A converter; and 25 a low-pass filter. The voice coil motor 10 in the coarse servo loop causes the entire optical head 9 to follow the relatively large component of track swing thereby to reduce the distance of movement of the light spot by the galvanomirror 4 in the fine servo loop. Thus, a two-stage tracking servo system is constituted. Then, in this embodiment, the driving current for the voice coil motor 10 is detected by the current detector circuit 21. The detected current is converted in a digital signal by the A/D converter 22, and the digital signal is stored in the digital memory 23. The timings of A/D conversion and storage are designated by control signals 26 and 27 from the control unit 11, respectively. The memory 23 has only to have a storage capacity corresponding to one rotation of the disk 1; the detected data (driving current) corresponding to one rotation is divided at intervals of a predetermined angle so that it is stored in the memory as a function of the angle (phase) from a reference position. Although the finer the division, the higher is the accuracy of the stored data, the degree of division is determined by the band of speed control. A method of averaging data corresponding to several rotations exchanged between the control unit 11 and the memory 23 may be used. The timings of the A/D conversion and storage, if they are used when the disk device is started up, are not required to be rewritten later. However, since the amount of track swing may vary according to disk positions (disk numbers or track numbers of a certain disk), a method of always storing the data while the light spot follows tracks may be adopted.

Numeral 13 denotes a pulsating circuit; 32 a differentiation circuit; 33 an integration circuit; 34 and 35 adder circuits; 36 a D/A converter; and 38 a subtracter circuit. These components constitute a head moving speed control loop in seeking. In seeking, the entire optical head is moved towards a target or object track by voice coil motor 10. Then, the switch is opened and instead of this, a command of closing the switch 30 is issued from the control unit 11. Then, a target speed data 37 for moving the optical head 9 to the target track is supplied from the control unit 11. The target speed data 37 is converted into an analog signal (target speed signal) 40 by the D/A converter 36. The analog signal is supplied to the subtracter circuit 38. The subtracter circuit 38 takes a difference between the target speed signal 40 and a detected speed signal 39. This difference is added to the track signal from the filter 18 by the adder 19. The resultant signal drives the voice coil motor 10 with the aid of the power amplifier 20. Thus, the optical head 9 is moved to the target track. Speed detection is carried out by pulsating the track signal (track traversing signal and head position signal) 14 by the pulsating circuit 31 and differentiating the pulsated signal by the differentiation circuit 32. On the other hand, the detected current value stored in the memory 23 during the previous track following (the current value is proportional to the acceleration when the head is driven to follow the track swing) is read from the memory 23 at the timing of a designation signal 28 from the control unit 11. The read signal is converted into an analog signal. This analog signal, after its digital noise is removed by the low-pass filter 25, is applied to the adder 35. Then, the adder 35 adds the current value detected by the current detector circuit 21 (the detected current value is proportional to the acceleration for a fixed component when the head is moved at a high speed for seeking) and the analog signal from the low-pass filter circuit 25. The addition output is integrated by the integration circuit 33 to provide a signal 42 including the speed change component due to track swing; this signal represents the relative head moving speed for a track. The signal 42 is applied to the adder circuit 34 (Incidentally, the integration (33) may be done in a digital manner before the D/A conversion (24)). The adder 34 adds the signal 42 to the signal 41 obtained when the track signal is pulsated by the pulsating circuit 31 and the pulse signal is differentiated by the differentiation circuit 32 (this signal 41 includes an intermittent and comparatively high speed change component). Thus, the adder 34 produces the final detected signal 39. The speed signal 39, which is wide-band head moving speed information including the speed change caused by track swing due to disk eccentricity, precisely represents an actual relative speed (particularly, the relative speed in the neighborhood of the target track) between the current track and the head. The speed signal 39 is compared with the target speed signal 40 by the subtracter circuit 38 to take a difference between them. As a result, the speed control loop (8, 19, 20, 21, 30, 31, 32, 33, 34, 35, 36 and 38) controls the voice coil motor 10 so that the relative head speed coincides with the target speed curve. Thus, pulling the head into the following servo when the head shifts from the seeking operation to the track following operation can be smoothly and swiftly.

In the above embodiment, the driving current value (proportional to the acceleration of the head) for the voice coil motor 10 detected when the track following control is done was stored in the memory 23, and thereafter the stored current, when it is read, was integrated to provide the signal proportional to the speed of the head. However, the detected driving current, before it is stored in the memory, may be integrated so as to provide a signal proportional to the head speed. In this case, the stored signal will be applied to the adder circuit 34 as it is. Further, the signal to be stored in the memory may be track swing itself.

In seeking, the track swing data is read from the memory in synchronism with the rotating phase of the disk so that the relative speed data in the same rotating phase as in storing the data in the memory is added in the seeking.

Further, in the above embodiment, the driving current for the voice coil 10 (coarse servo loop) was detected as the head driving current in track following. However, a composite signal of this driving signal and that for the galvanomirror 4 (fine serve loop) may be detected. If the driving current when the optical head is driven by only the voice coil 10 is estimated using the composite signal, the head driving current can be corrected more precisely.

In the above embodiment, the track swing due to disk eccentricity was detected in terms of the head driving current in the above track following control. However it may be detected by the method disclosed in e.g., JP-A-58-77073 in which the disk recording medium is rotated with the head remaining stationary at a certain radial position, and then the number of tracks which the head traverses is measured in several rotation phases over at least one rotation of the disk.

Incidentally, the head moving speed can be also controlled in the following manner. The remaining number of tracks from a current position in seeking state to a target position is counted by a counter (not shown) to which a pulse generated when the head traverses a track is inputted. The target speed curve is set as a function of the remaining number of tracks. Thus, even when the track position swing due to disk eccentricity occurs, the head moving speed can be controlled by the relative speed corresponding to the, current remaining number of tracks (i.e., the relative position for a track).

As described in detail above, in accordance with the present invention, the data relative to the track swing during at least one rotation of a disk recording medium (e.g., the driving current for head driving circuit when a head is under track following control) is previously stored, the integral signal (representing the head speed for a fixed component) of the driving current for the head driving circuit is corrected by the data relative to the track swing to provide the relative head speed information for a track, and this information is added to the differential signal of the position information due to track traversing to provide final head speed information. Thus, even when the track swing due to the eccentricity of the disk recording medium occurs, the relative head speed for a track can be detected precisely. As a result, the relative head speed in seeking can be controlled so that it accurately coincides with a target speed.

The invention has been described with reference to the preferred and alternate embodiments. Obviously, modifications and alternations will occur to those of ordinary skill in the art upon reading and understanding the present invention. It is intended that the invention be construed as including all such modifications and alternations in so as they come with the scope of the appended claims or the equivalent thereof.

I claim:

1. An information recording/reproducing device comprising:

a head for recording/reproducing information on/-from a disk recording medium;

head driving means for positioning the head on a target track of the recording medium; and speed control means including means for storing data relative to track swing over at least one rotation section of the recording medium, means for differentiating, in seeking, position information obtained when the head traverses a track on the recording medium thereby to introduce first head speed information for the track, means for integrating, in seeking, the driving current for the head driving means thereby to introduce head speed information for a fixed component and correcting the introduced head speed information using the data relative to the track swing to provide second head speed information for the track, and means for composing the first and second speed information into third head speed information for the track, thereby controlling the head driving means so that the third head speed information coincides with a target speed signal.

2. An information recording/reproducing device according to claim 1, wherein said means for storing data relative to track swing comprises means for previously detecting the driving current supplied to said head driving means over at least one rotation section of said recording medium while track following control is executed, and means for storing the detected driving current.

3. An information recording/reproducing device according to claim 1, wherein said means for storing data relative to track swing is means for previously acquiring the track swing in terms of the number of tracks which the head traverses when said recording medium is rotated with the head remaining stationary at a certain radial position of said recording medium, and storing it.

4. An information recording/reproducing device according to claim 1, wherein said data relative to track swing are prepared for plural positions in the radial direction of said recording medium.

5. An information recording/reproducing device according to claim 1, wherein said data relative to track swing are prepared in actuating the information recording/reproducing device and stored.

6. A method for controlling positioning of a recording/reproducing head comprising the following steps of:

storing data relative to track swing over at least one rotation section of a disk recording medium;

differentiating, in seeking, position information obtained when the head traverses a track on the recording medium thereby to introduce first head speed information for the track;

integrating, in seeking, the driving current of a head driving means thereby to introduce head speed information for a fixed component and correcting the introduced head speed information using the data relative to the track swing to provide second head speed information for the track;

composing the first and second speed information into third head speed information for the track; and controlling the speed of said recording/reproducing head so that the third head speed information coincides with a target speed signal.

7. A method of controlling positioning of a recording/reproducing head according to claim 6, wherein said step of storing data relative to track swing comprises the steps of:

previously detecting the driving current for said head over at least one rotation section of said recording medium while track following control is executed; and storing the detected driving current.

8. A method of controlling positioning of a recording/reproducing head according to claim 6, wherein said step of storing data relative to track swing comprises the steps of:

previously acquiring the track swing in terms of the number of tracks which the head traverses when said recording medium is rotated with the head remaining stationary at a certain radial position of said recording medium, and storing it.

9. A method of controlling positioning of a recording/reproducing head according to claim 6, wherein said data relative to track swing are prepared for plural positions in the radial direction of said recording medium.

10. A method of controlling positioning of a recording/reproducing head according to claim 6, wherein said data relative to track swing are prepared in actuating the information recording/reproducing device and are stored.

* * * * *